US011509874B2

(12) United States Patent
Ohno

(10) Patent No.: US 11,509,874 B2
(45) Date of Patent: Nov. 22, 2022

(54) VIDEO PROJECTOR AND VIDEO DISPLAY METHOD

(71) Applicant: NEC Platforms, Ltd., Kawasaki (JP)

(72) Inventor: Kenichi Ohno, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 97 days.

(21) Appl. No.: 16/969,349

(22) PCT Filed: Feb. 12, 2019

(86) PCT No.: PCT/JP2019/004819
§ 371 (c)(1),
(2) Date: Aug. 12, 2020

(87) PCT Pub. No.: WO2019/159880
PCT Pub. Date: Aug. 22, 2019

(65) Prior Publication Data
US 2021/0051304 A1 Feb. 18, 2021

(30) Foreign Application Priority Data
Feb. 16, 2018 (JP) .............................. JP2018-026171

(51) Int. Cl.
*G03B 21/20* (2006.01)
*H04N 9/31* (2006.01)
(52) U.S. Cl.
CPC ......... *H04N 9/3182* (2013.01); *G03B 21/206* (2013.01); *G03B 21/2053* (2013.01); *H04N 9/3155* (2013.01); *G09G 2360/14* (2013.01)
(58) Field of Classification Search
None
See application file for complete search history.

(56) References Cited

U.S. PATENT DOCUMENTS

| 6,634,757 | B2 | 10/2003 | Asakawa | |
|---|---|---|---|---|
| 8,077,995 | B1* | 12/2011 | Terre | H04N 5/33 |
| | | | | 382/254 |

(Continued)

FOREIGN PATENT DOCUMENTS

| CN | 101038719 | 9/2007 |
|---|---|---|
| CN | 102132555 A | 7/2011 |

(Continued)

OTHER PUBLICATIONS

Extended European Search Report for EP Application No. EP19754113.9 dated Mar. 12, 2021.

(Continued)

*Primary Examiner* — Matthew Yeung
(74) *Attorney, Agent, or Firm* — Sughrue Mion, PLLC

(57) ABSTRACT

To provide a video projector which improves visibility in response to changes in projection environment, a video projector has an initial level setter, a level adjuster, a projection display, an image capture, and a projection histogram calculator. The initial level setter performs a prescribed initial level setting on an input video signal and outputs an initial display signal. The level adjuster adjusts the level of the initial display signal on the basis of a projection image and outputs a display signal. The image capture captures the projection image projected on a projection surface by the projection display based on the display signal. The projection histogram calculator prepares a projection histogram for each color. The level adjuster adjusts the level of the initial display signal for each color on the basis of the projection histogram.

12 Claims, 18 Drawing Sheets

(56) References Cited

U.S. PATENT DOCUMENTS

| | | |
|---|---|---|
| 9,055,237 B1 | 6/2015 | Chang et al. |
| 2005/0190986 A1* | 9/2005 | Sakurai .............. H04N 1/40068 |
| | | 382/275 |
| 2006/0170658 A1 | 8/2006 | Nakamura et al. |
| 2011/0157409 A1 | 6/2011 | Adachi |
| 2012/0013634 A1 | 1/2012 | Haraguchi et al. |
| 2014/0118424 A1 | 5/2014 | Young |
| 2018/0205919 A1* | 7/2018 | Nakagawa ........... G03B 21/206 |
| 2018/0220112 A1 | 8/2018 | Miichi |
| 2018/0220113 A1* | 8/2018 | Ouchi .................. H04N 9/3182 |

FOREIGN PATENT DOCUMENTS

| | | |
|---|---|---|
| CN | 103971621 A | 8/2014 |
| CN | 107193172 A | 9/2017 |
| JP | H08-289236 A | 11/1996 |
| JP | H09-98299 | 4/1997 |
| JP | 2008-039494 | 2/2008 |
| JP | 2009-171010 A | 7/2009 |
| JP | 2010-081588 A | 4/2010 |
| JP | 2010-197541 A | 9/2010 |
| JP | 2017-167500 A | 9/2017 |
| WO | 2010/024344 A1 | 3/2010 |
| WO | 2017/033384 A1 | 3/2017 |

OTHER PUBLICATIONS

Chinese Office Action for CN Application No. 201980013190.1 dated Aug. 2, 2021 with English Translation.

International Search Report for PCT Application No. PCT/JP2019/004819, dated May 7, 2019.

English translation of Written opinion for PCT Application No. PCT/JP2019/004819, dated May 7, 2019.

Japanese Office Action for JP Application No. 2018-026171 dated Mar. 22. 2022 with English Translation.

Chinese Office Communication for CN Application No. 201980013190.1 dated Mar. 2, 2022 with English Translation.

* cited by examiner

VIDEO PROJECTOR AND VIDEO DISPLAY METHOD

TECHNICAL FIELD

The present invention relates to a video projector and a video display method.

BACKGROUND ART

In a projector to be used in various environments, a change in brightness of a projection environment causes a phenomenon of decreasing visibility, such as clipped highlights and clipped shadows. For this reason, an attempt has been made to improve visibility by adjusting a projection video depending on the environment.

For example, PTL 1 discloses a technique for a projector that projects a video by avoiding an area unsuitable for projection on a projection surface. In this technique, first, test images in red (R), green (G), blue (B), and black are projected. Then, each projection image is captured, and an abnormally dark part and an abnormally high saturation part on the projection surface are detected. A user is notified that there is such an abnormal point. A projection position is moved or a size of the projection image is reduced in such a way that the abnormal point is not included in the projection area. In this way, after a surface suitable for projection is selected as a projection surface, a luminance level of each color is set based on a capturing result of the test images, and thus a luminance level suitable for the environment can be set.

CITATION LIST

Patent Literature

[PTL 1] Japanese Unexamined Patent Application Publication No. 2009-171010

SUMMARY OF INVENTION

This application is a National Stage Entry of PCT/JP2019/004819 filed on Feb. 12, 2019, which claims priority from Japanese Patent Application 2018-026171 filed on Feb. 16, 2018, the contents of all of which are incorporated herein by reference, in their entirety.

Technical Problem

However, in the technique in PTL 1, there is a problem that the test images need to be projected in order to adjust the luminance level. For example, in an environment such as an outdoor environment, brightness of surroundings changes from moment to moment, and thus, even when the level is set precisely, the setting may not be an optimal level any more as time elapses. In this case, the test projection and the adjustment may be performed again, however, the projection of the video needs to be interrupted each time, and thus it is difficult to actually perform the readjustment.

The present invention is devised in order to solve the above-described problem, and an object of the present invention is to provide a video projector that performs adjustment for improving visibility depending on a change in a projection environment.

Solution to Problem

In order to solve the above-described problem, a video projector according to the present invention includes an initial level setting means, a level adjusting means, a projection display means, an image capture means, and a projection histogram calculation means. The initial level setting means performs a predetermined initial level setting on an input video signal, and outputs the signal as an initial display signal. The level adjusting means adjusts a level of the initial display signal, based on a projection image, and outputs a display signal. The projection display means performs projection display of a video, based on the display signal. The image capture means captures a projection video projected on a projection surface. The projection histogram calculation means generates a projection histogram for each color. The level adjusting means adjusts a level of the initial display signal for each color, based on the projection histogram.

Advantageous Effects of Invention

An advantageous effect of the present invention is to be able to provide the video projector that performs adjustment for improving visibility depending on a change in a projection environment.

EXAMPLE EMBODIMENT

In the following, example embodiments of the present invention are described in detail with reference to the drawings. The below-described example embodiments include technically preferred limitations in order to implement the present invention, however, the scope of the invention is not limited to the following. A similar component in each drawing is assigned with the same number, and thereby the description thereof may be omitted.

First Example Embodiment

Figure 1:
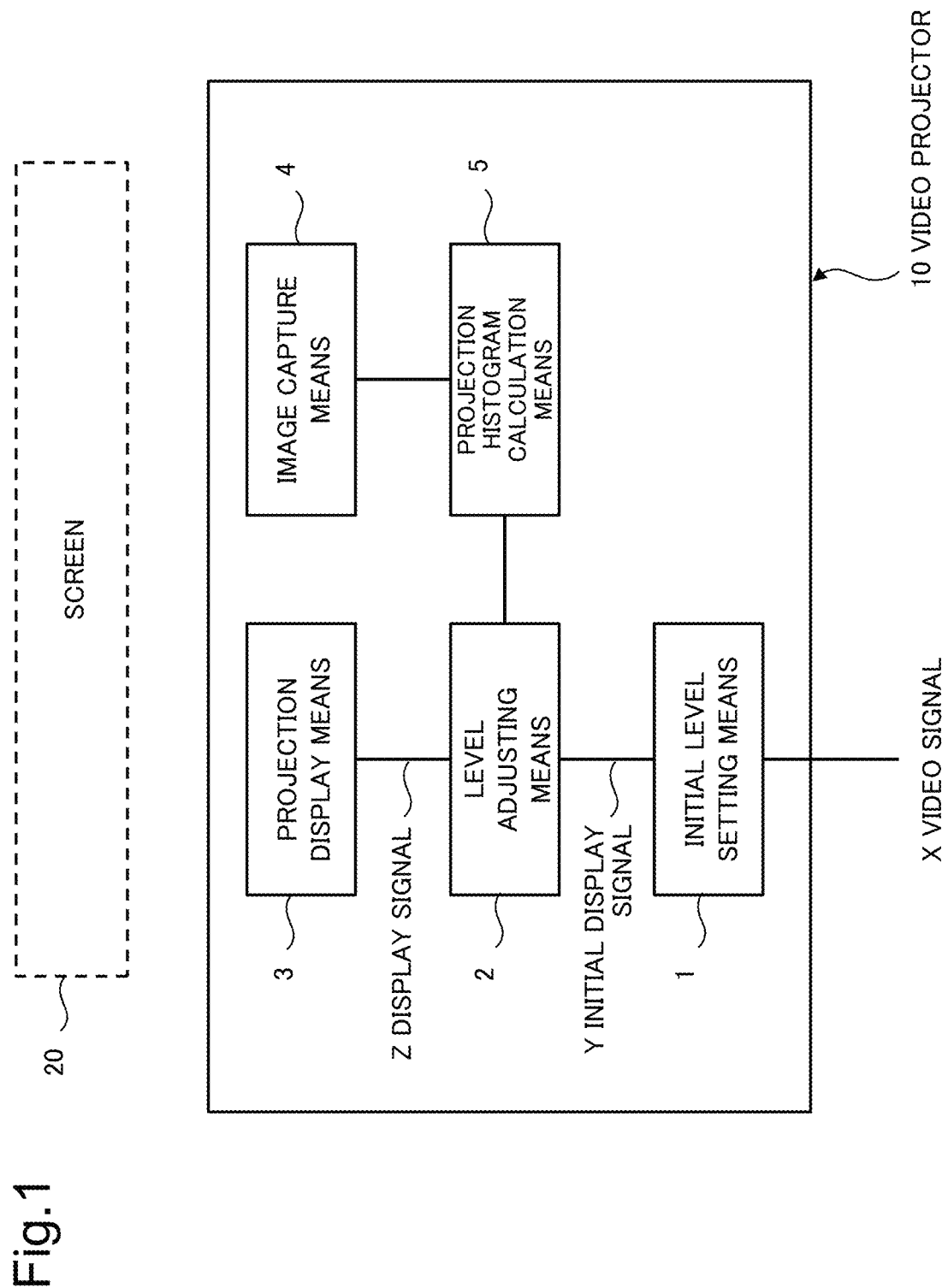
FIG. 1 is a block diagram illustrating a video projector according to a first example embodiment.

FIG. 1 is a block diagram illustrating a video projector according to a first example embodiment. A video projector 10 includes an initial level setting means 1, a level adjusting means 2, a projection display means 3, an image capture means 4, and a projection histogram calculation means 5.

The initial level setting means 1 performs a predetermined initial level setting on an input video signal X. Herein, the level setting is a control for setting, for each color, signal levels of black having the lowest luminance and white having the highest luminance and quantizing the luminance in a predetermined number of gradations. For example, when the gradation is 8 bits, the gradation is quantized by setting black to white in such a way as to be 0 to 255, 16 to 255, or the like. Herein, it is assumed that a signal acquired by performing the initial level setting on the video signal is referred to as an initial display signal Y.

The level adjusting means 2 adjusts a level of the initial display signal Y, based on a projection image, generates a display signal Z, and outputs the display signal Z to the projection display means 3. A adjusting method will be described later.

The projection display means 3 receives the display signal Z, and performs projection display of a video, based on the display signal Z. The projection display means 3 includes, for example, a light source, a luminance modulation element such as a liquid crystal panel or a mirror device, a color filter, a control circuit for controlling the luminance modulation element in response to the display signal Z, and the like.

The image capture means 4 captures a projection video projected from the projection display means 3 onto a projection surface such as a screen 20.

The projection histogram calculation means 5 aggregates, with respect to each color, luminance for each pixel of the projection video and generates a projection histogram.

The level adjusting means 2 adjusts the level of the initial display signal for each color, based on the projection histogram. Specifically, for example, adjusting for improving visibility is performed by shifting, when there are few low-luminance frequencies, a black level to a high luminance side, and shifting, when there are few high-luminance frequencies, a white level to a low luminance side.

As described above, according to the present example embodiment, it is possible to configure the video projector that improves visibility depending on an environment, based on an image of a projection video.

Second Example Embodiment

Figure 2:
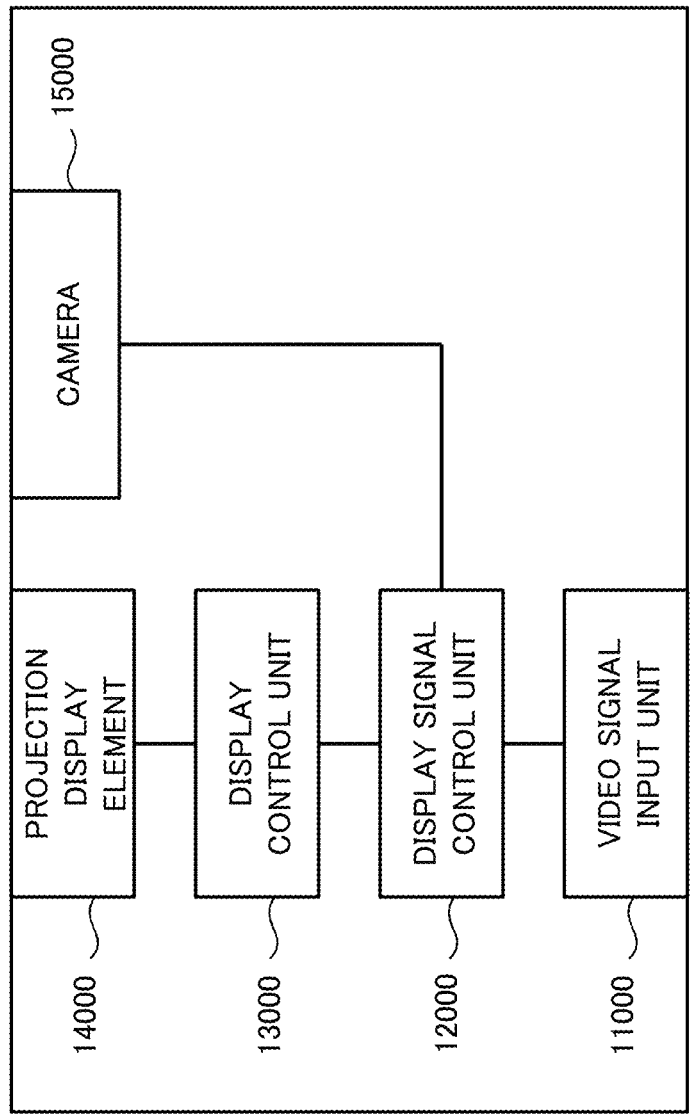
FIG. 2 is a block diagram illustrating a hardware configuration of a video projector according to a second example embodiment.

FIG. 2 is a block diagram illustrating a hardware configuration of a video projector according to a second example embodiment. A video projector 10000 includes a video signal input unit 11000, a display signal control unit 12000, a display control unit 13000, a projection display element 14000, and a camera 15000.

The video signal input unit 11000 receives an input of a video signal from an outside. Specifically, the video signal input unit 11000 is, for example, a video input terminal.

The display signal control unit 12000 outputs a display signal necessary for projection display of an image by a projection display element 14000, based on the input video signal. At this time, a predetermined level adjustment is performed, however a feature of the present example embodiment is that level adjusting is performed based on a projection image captured by the camera 15000. Details of the level adjusting will be described later. The display signal control unit 12000 is, for example, an integrated circuit (IC) including a central processing unit (CPU) and a memory.

The display control unit 13000 controls the projection display element 14000 in such a way as to display an image in response to the input display signal. The display control unit 13000 is an IC including a driver that drives the projection display element 14000.

The projection display element 14000 performs projection display of the image under the control of the display control unit 13000. The projection display element 14000 includes, for example, a light source, a luminance modulation element such as a liquid crystal panel or a mirror device, and a color filter.

Figure 3:
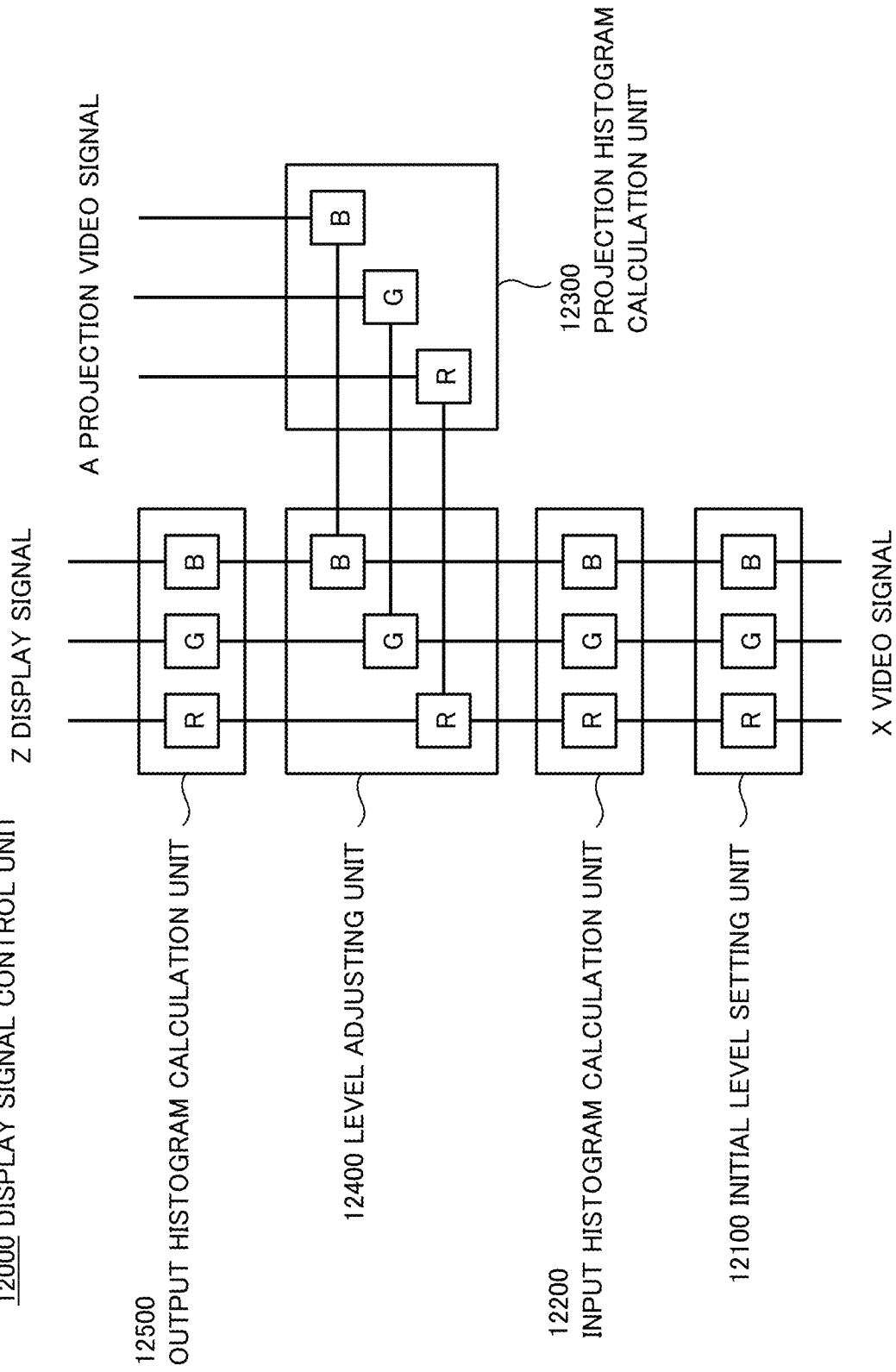
FIG. 3 is a block diagram illustrating a configuration example of a display signal control unit according to the second example embodiment.

Next, details of the display signal control unit 12000 will be described. FIG. 3 is a block diagram illustrating a configuration example of the display signal control unit 12000. The display signal control unit 12000 includes an initial level setting unit 12100, an input histogram calculation unit 12200, a projection histogram calculation unit 12300, a level adjusting unit 12400, and an output histogram calculation unit 12500. Each component is divided into blocks that process the three primary colors of light, red (R), green (G), and blue (B) separately, and a signal of each color is controlled by each separated system.

The initial level setting unit 12100 receives the input of the video signal, performs a predetermined initial level setting, and outputs an initial display signal. The level setting is a control that sets a black level having the lowest luminance and a white level having the highest luminance and quantizes gradation in a predetermined step. For example, when the gradation is 8 bits, the gradation is quantized by setting black to white in such a way as to be 0 to 255, 16 to 255, or the like.

The input histogram calculation unit 12200 calculates a histogram of the initial display signal to be input to the level adjusting unit 12400. The histogram represents a frequency of occurrence of each gradation.

Figure 4:
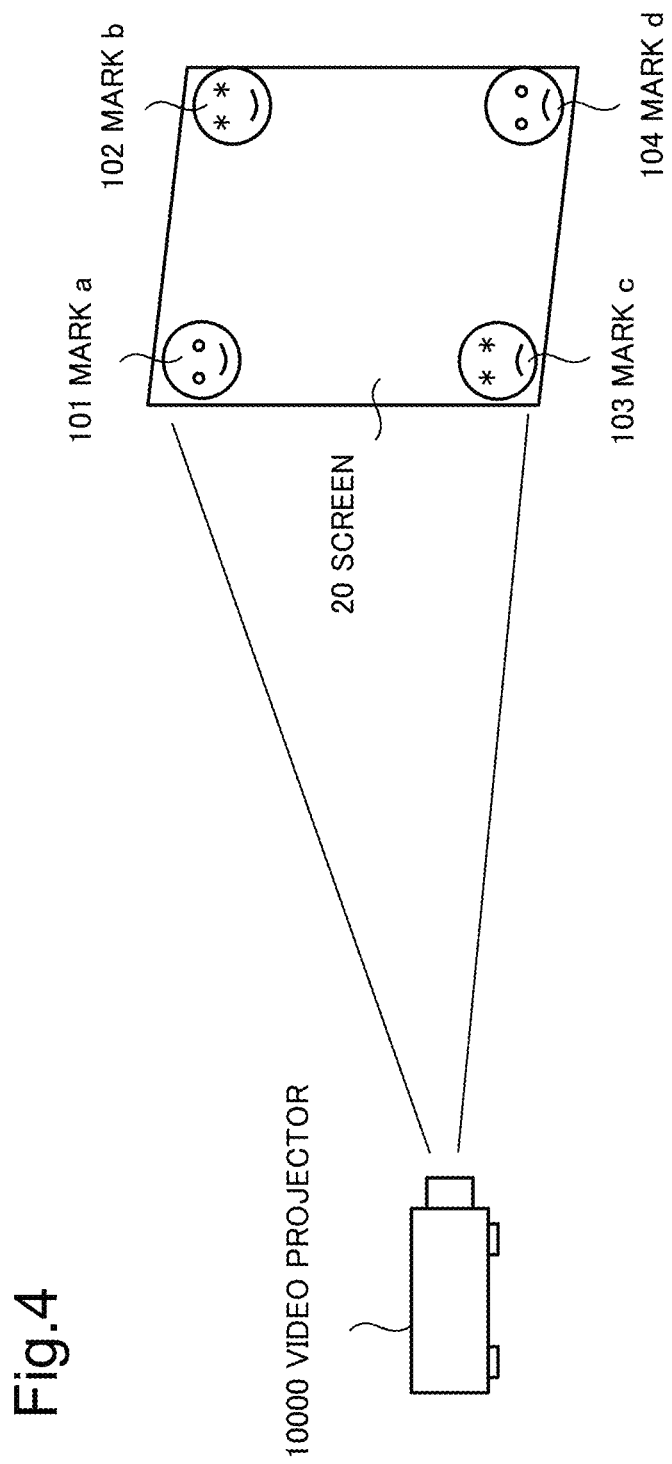
FIG. 4 is a schematic diagram illustrating a calibration method of a camera according to the second example embodiment.

The projection histogram calculation unit 12300 receives a projection video signal acquired from a projection surface captured by the camera 15000, and calculates a histogram of the projection video. In order to specify a range of the projection video in the video captured by camera 15000, calibration is performed in advance on a range of histogram calculation. FIG. 4 is a schematic diagram illustrating one example of the calibration. A mark a 101, a mark b 102, a mark c 103, and a mark d 104 are each projected from the video projector 10000 to each of four corners of the projection display range. Herein, a method that the marks a to d are four types of faces and the projection histogram calculation unit 12300 specifies the four corners by face authentication is exemplified.

The level adjusting unit 12400 performs level adjusting of the display signal, based on the projection histogram, in such a way as to improve visibility of the projection video. In the following, details of the level adjusting will be described.

Figure 5:
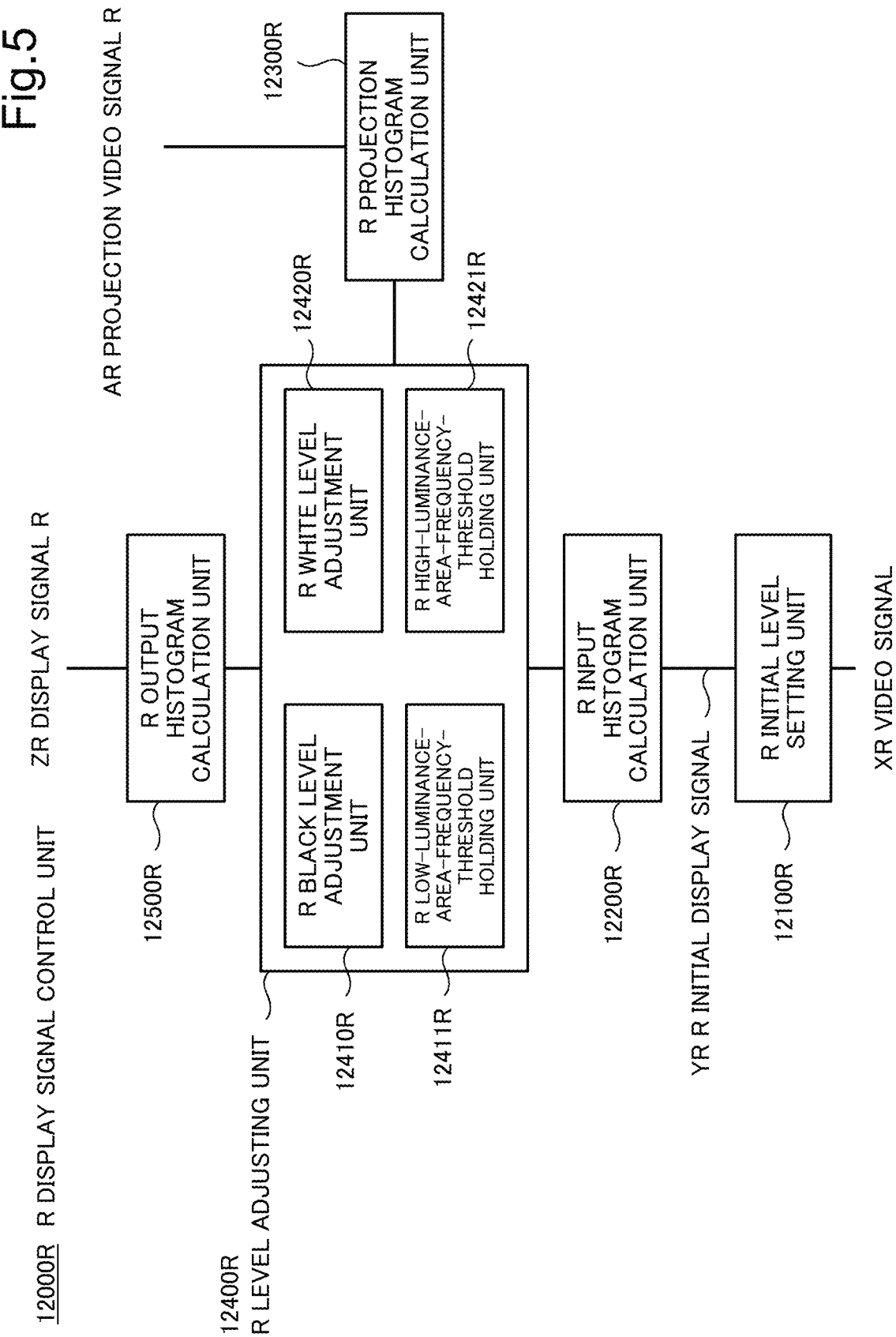
FIG. 5 is a block diagram illustrating a configuration example for one color of a level adjusting unit according to the second example embodiment.

FIG. 5 is a block diagram illustrating one system (color) of the display signal control unit 12000. The display signal control unit 12000 controls a signal by separating the system for each color, and thus an R display signal control unit 12000R being a system for red (R) is exemplified herein. Note that only R is described herein, however G and B can also have a similar configuration.

An R initial level setting unit 12100R performs an initial level setting of R and outputs an R initial display signal YR. An R input histogram calculation unit 12200R calculates a histogram of an R initial display signal YR to be output to an R level adjusting unit 12400R.

An R projection histogram calculation unit 12300R calculates a histogram of a projection video captured by the camera 15000. A level of the histogram can be the same as the calculation of the input histogram, for example.

The R level adjusting unit 12400R receives the projection histogram, performs the level adjusting of an R initial input signal YR in such a way as to improve visibility of the projection video, and outputs an R display signal ZR. Specifically, when the gradation of the projection video is biased, the adjusting is performed in such a way as to reduce the bias. For this purpose, the R level adjusting unit 12400R includes an R black level adjustment unit 12410R and an R white level adjustment unit 12420R.

The R black level adjustment unit 12410R refers to a threshold of a frequency of an R low luminance area held in an R low-luminance-area-frequency-threshold holding unit 12411R, and compares the threshold with a frequency of a low luminance area of the projection histogram. Then, when there is a low luminance area with the frequency smaller than the threshold that continues from the black level, adjusting is performed for shifting an output black level to a high luminance side (high gradation side) in such a way as not to include the area in the display.

The R white level adjustment unit 12420R refers to a threshold of a frequency of an R high luminance area held in an R high-luminance-area-frequency-threshold holding unit 12421R, and compares the threshold with a frequency of a high luminance area of the projection histogram. Then, when there is a high luminance area with the frequency smaller than the threshold that continues from the white level, adjusting is performed for shifting the white level to a low luminance side (low gradation side) in such a way as not to include the area in the display.

Figure 6:
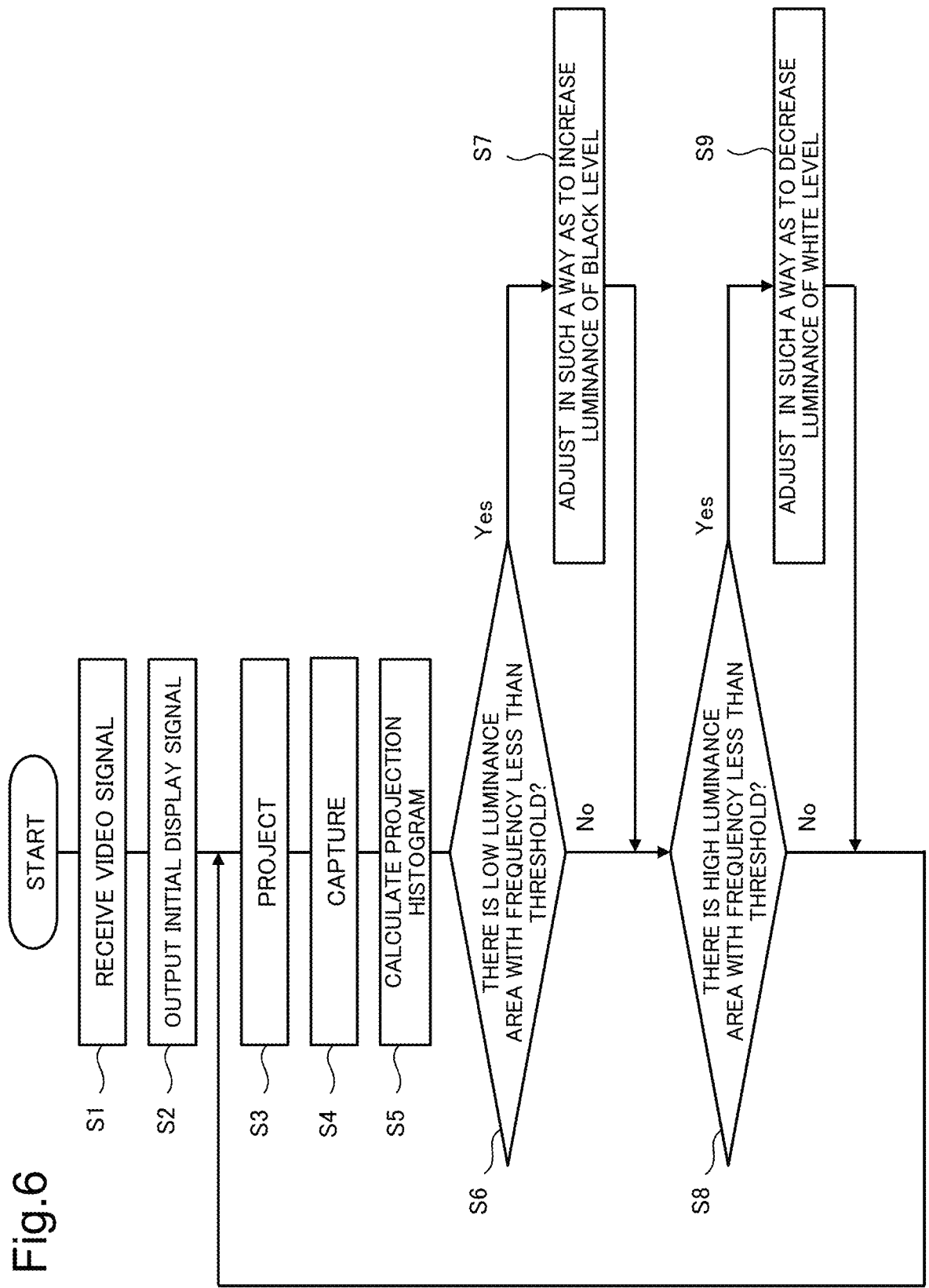
FIG. 6 is a flowchart illustrating an operation of the video projector according to the second example embodiment.

FIG. 6 is a flowchart illustrating an operation of the video projector 10000. First, the video signal input unit 11000 receives a video signal (S1). Next, the initial level setting unit 12100 generates and outputs an initial display signal (S2). Next, the display control unit 13000 controls the projection display element 14000 in response to the initial display signal, and projects a video (S3). Next, the camera 15000 captures the projected video (S4). Next, the projection histogram calculation unit 12300 calculates a projection histogram of the captured projection video (S5). Next, the level adjusting unit 12400 receives the projection histogram, and when the projection histogram is biased, performs level adjusting of the initial display signal in such a way as to reduce the bias, and outputs a display signal. As a specific operation, first, the level adjusting unit 12400 determines whether there is a low luminance area with a frequency less than a threshold (S6), and when there is an area with the frequency less than the threshold (Yes in S6), adjusts the level in such a way as to increase the luminance of the black level (S7). On the other hand, when there is not the area with the frequency less than the threshold (No in S6), the adjusting is not performed. Next, the level adjusting unit 12400 determines whether there is a high luminance area with a frequency less than the threshold (S8), and when there is an area with the frequency less than the threshold (Yes in S8), adjusts the level in such a way as to decrease the luminance of the white level (S9). On the other hand, when there is not the area with the frequency less than the threshold (No in S8), the adjusting is not performed. Then, the operation returns to S3 in such a way as to project an image on which the adjusting of the black level and/or the white level is performed. Note that an order of the black level adjusting and the white level adjusting in S6 to S9 may be reversed.

Next, a specific example according to the present example embodiment will be described.

Specific Example 1

Figure 7:
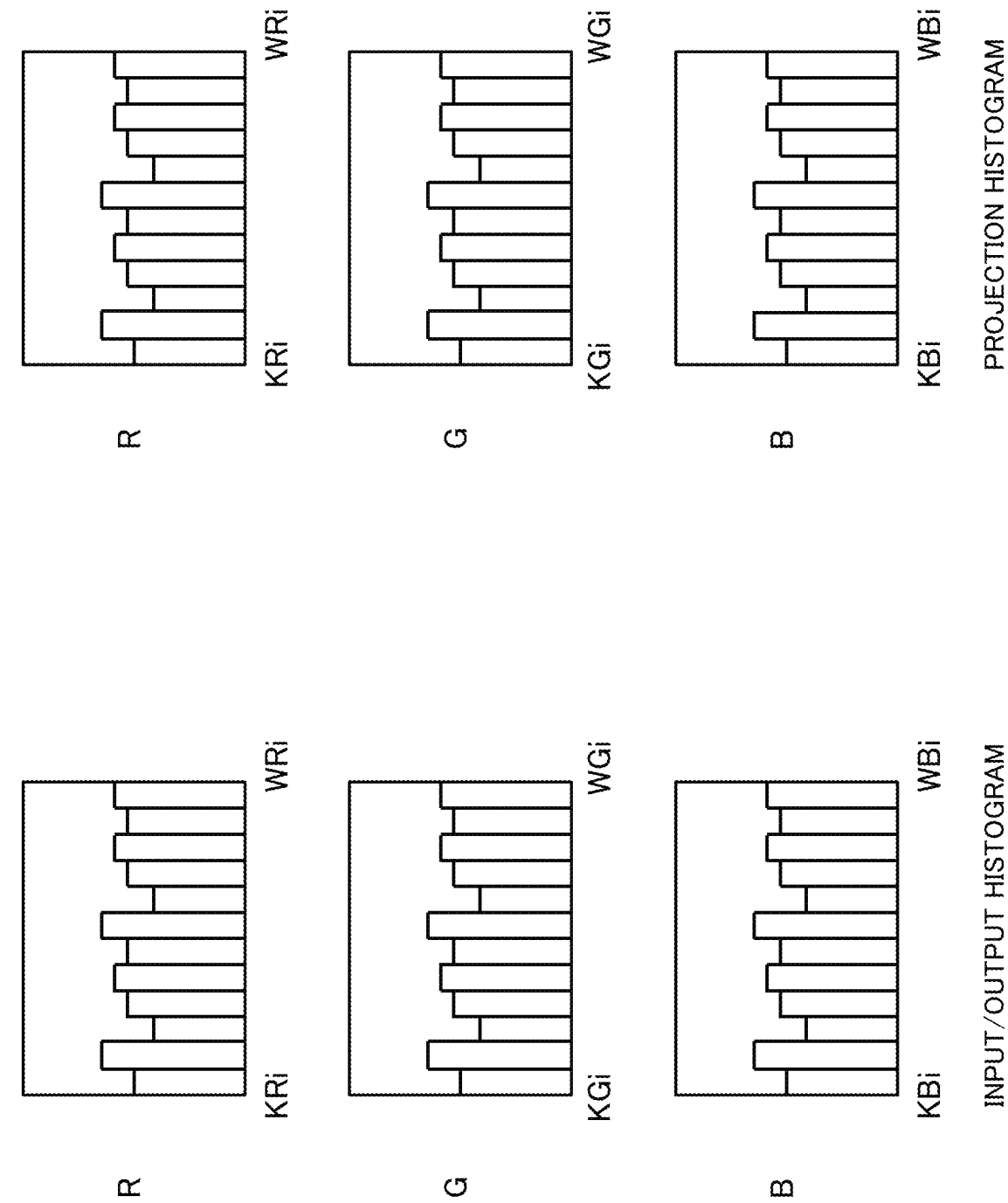
FIG. 7 is a schematic diagram illustrating a histogram when adjusting is not performed according to the second example embodiment.

In a dark environment, i.e., an environment where there is no incident light from other than a projector, an output histogram and a projection histogram are almost the same. Further, adjusting is not performed, and thus an input histogram and an output histogram are the same. FIG. 7 illustrates such situation. The left side of FIG. 7 is the input/output histogram of each of R, G, and B, and the right side is the projection histogram of each of R, G, and B. Herein, the black level of the histogram is represented by K and the white level is represented by W, and an input black level of the input histogram of R is represented as KRi and an input white level thereof is represented as WRi. Similarly, an input black level and input white level of G are represented as KGi and WGi, respectively, and an input black level and input white level of B are represented as KBi and WBi, respectively.

Figure 8:
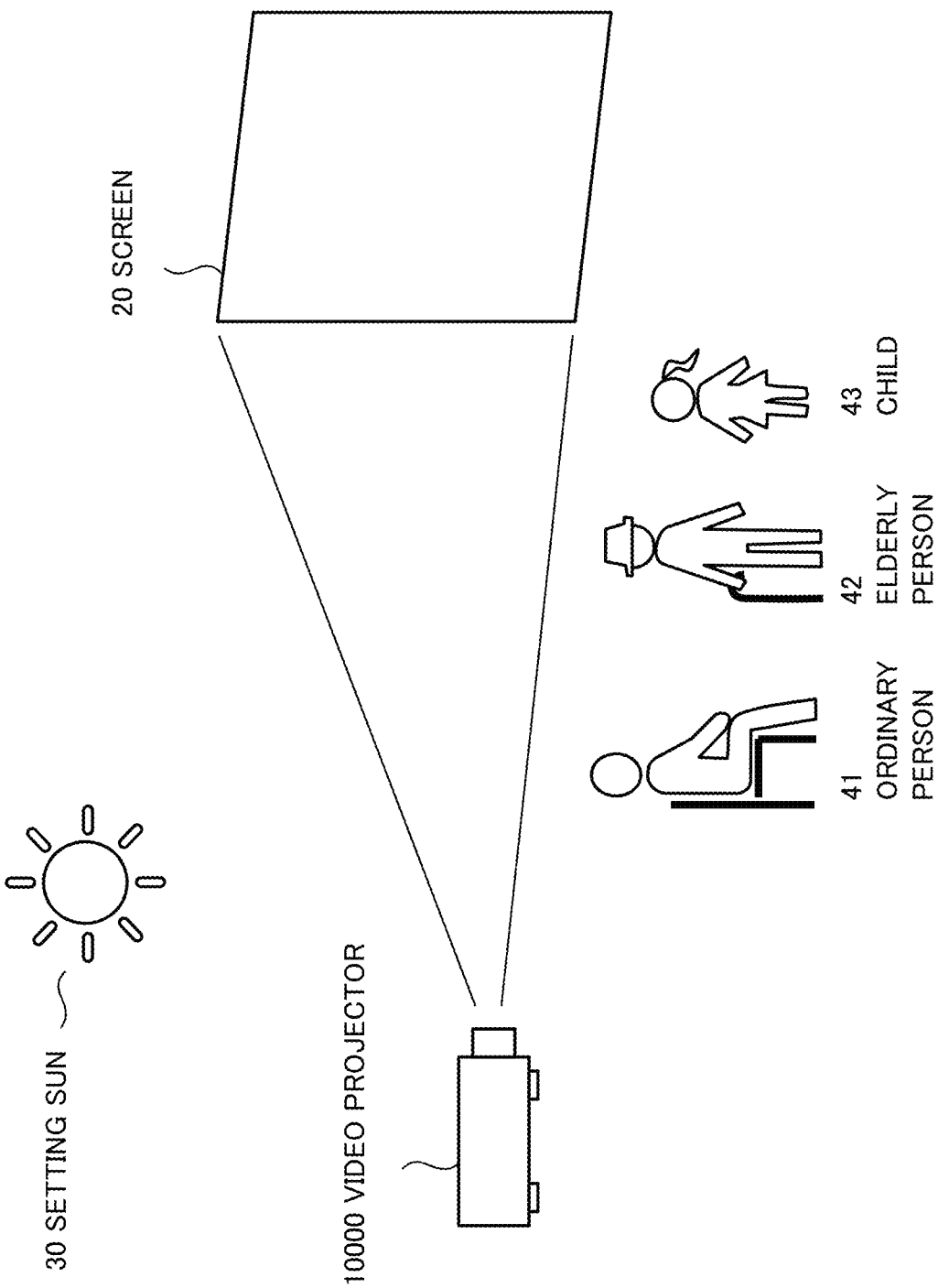
FIG. 8 is a schematic diagram illustrating an environment for projection display of a specific example 1 according to the second example embodiment.

Herein, a case where red light such as light of the setting sun is incident is considered. FIG. 8 is a schematic diagram illustrating such situation. The video projector 10000 projects a video on the screen 20, and an ordinary person 41, an elderly person 42, and a child 43 are watching the video. The light of the setting sun is incident in a watching place. At this time, it is assumed that the ordinary person 41 and the child 43 can recognize the video, however the elderly person 42 having a low recognition ability of a video cannot recognize the video.

Figure 9:
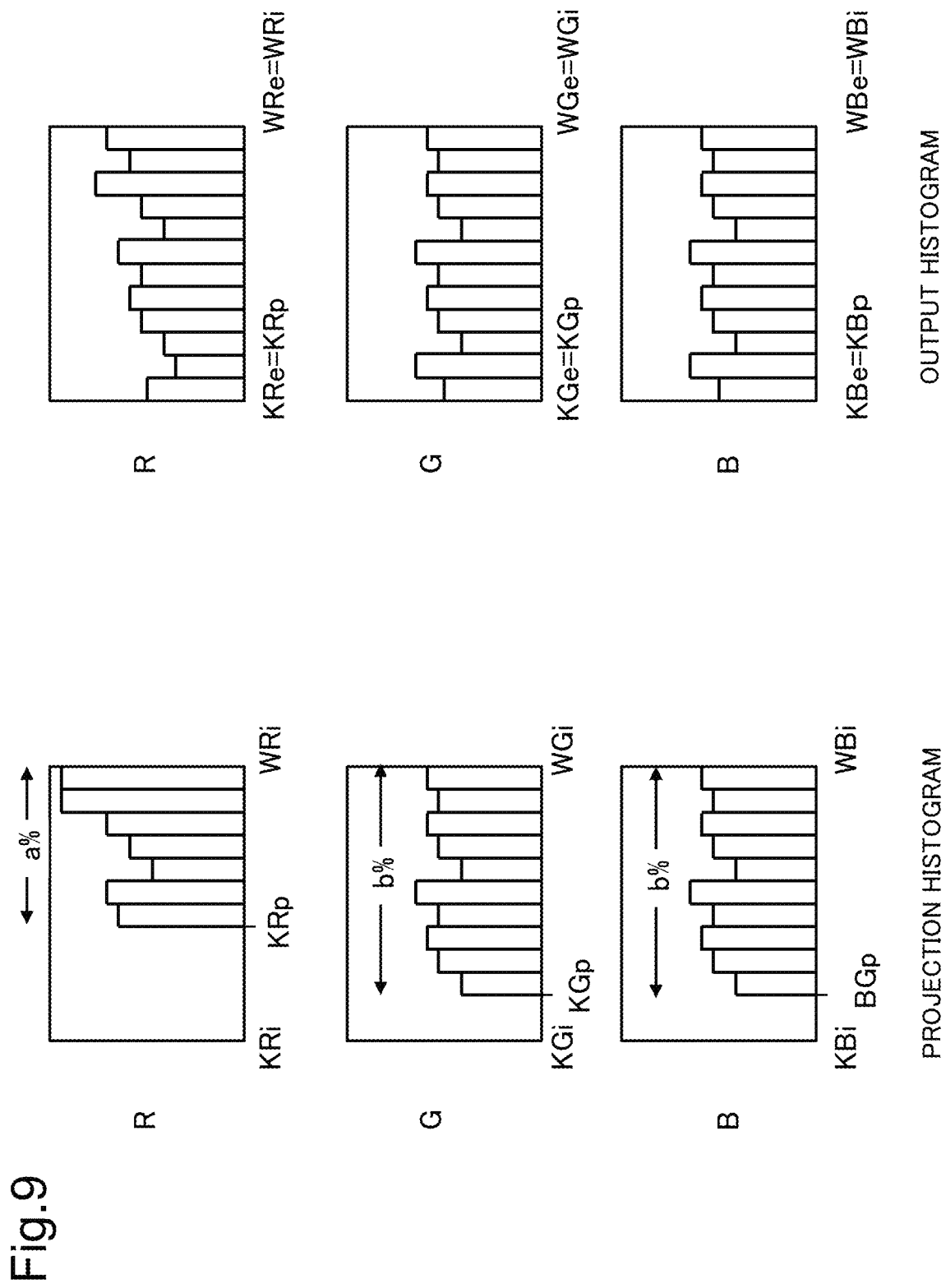
FIG. 9 is a schematic diagram illustrating a level adjusting method of the specific example 1 according to the second example embodiment.

The left side of FIG. 9 illustrates the projection histogram in the above situation. In the histogram of R, the luminance of red in a background increases and thus a frequency of a pixel with luminance lower than a certain level disappears. The level being the boundary is considered as the black level of the R projection histogram and is represented as KRp. Herein, when WRi to KRp is defined as a % of WRi to KRi, it means that only a % of the gradation of the input histogram is expressed in the projection video. Further, in an area close to the input white level WRi, the frequency is large, and a state in which the gradation difference in the area is not sufficiently displayed, a so-called phenomenon of clipped highlights, occurs.

When the above-described projection histogram is received, the R level adjusting unit 12400R refers to a threshold of a frequency of the R low luminance and determines the luminance of which frequency is equal to or less than the threshold as a projection black level KRp. Then, adjusting is performed for shifting the black level to the high luminance side. For example, the level adjusting is performed in such a way that KRp is set to the black level of the output histogram, and a range of KRp to WRi, which is equivalent to a % of an original range, is divided into a predetermined number of bits (for example, 8 bits). Thus, the output histogram of R becomes as illustrated in the upper right of FIG. 9. As a result, the luminance on the low luminance side becomes higher than the background, and the visibility is improved. In addition, the width of each gradation becomes narrower, and thus the number of gradations on the high luminance side increases and the state of clipped highlights is also improved. Such level adjusting is repeatedly performed by feeding back the projection histogram as illustrated in the flowchart of FIG. 6.

Further, it is assumed that, due to the incident light of the setting sun, even in each of the projection histograms of G and B, a frequency of the darkest part disappears and a range of gradation expression is reduced to b % of the histogram of the video. In this case, the level adjusting is also performed similarly to the case of R and the visibility can be improved. For example, the black level of G is changed from KGi to KGp, and a luminance range of the output histogram is reduced to b % of the input histogram. Similarly, a luminance range of the output histogram of B is also reduced to b % of the input histogram. As a result, the output histograms of G and B become as illustrated in the middle and bottom of the right side of FIG. 9, respectively, and the gradation of the projection display can be increased.

As described above, by performing the level adjusting that feeds back the projection histogram calculated from the captured video, the visibility can be improved in the environment where light is incident.

Specific Example 2

Figure 10:
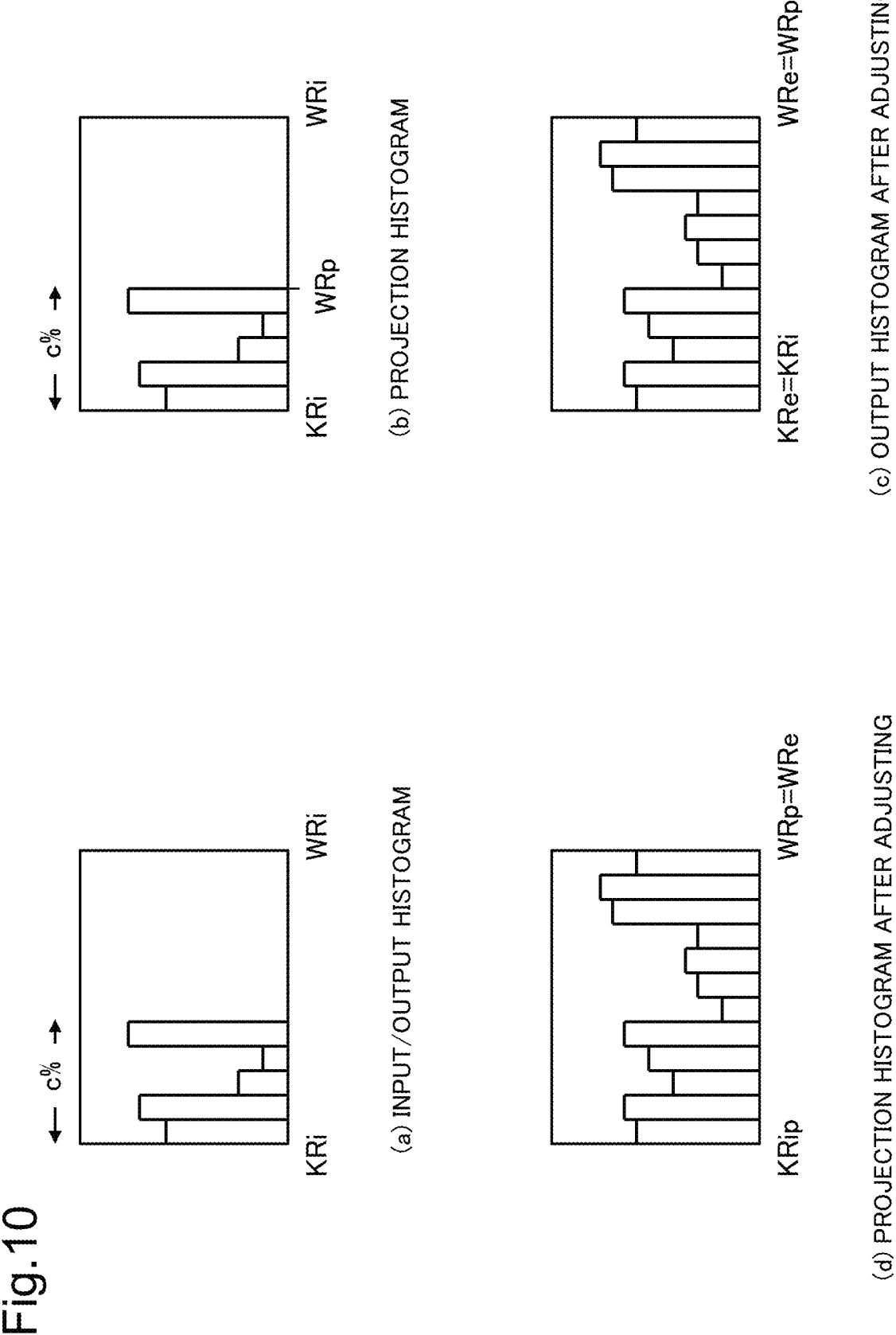
FIG. 10 is a schematic diagram illustrating a level adjusting method of a specific example 2 according to the second example embodiment.

When the video signal includes only a low luminance signal, the number of gradations to be displayed decreases. A dark image of the starry sky is cited as an example. FIG. 10 illustrates a schematic diagram of an example of level adjusting in such a case. Note that, only R will be described herein, however the following operation is similarly applicable to G and B.

First, the input histogram of the initial display signal generated from the video signal is as illustrated in FIG. 10(*a*). Then, the projection histogram of a video initially performed projection display is as illustrated in FIG. 10(*b*). In the projection histogram, only c % being a part of the input level WRi to KRi is displayed. For this reason, it may be difficult to recognize information due to a small number of gradation to be displayed.

In such a case, the R white level adjustment unit 12420R adjusts the white level, thereby improving visibility. The R white level adjustment unit 12420R refers to the threshold of the frequency of the R high luminance area and determines the luminance of which frequency is equal to or less than the threshold as a projection white level WRp. The adjusting is performed for shifting the white level to the high luminance side, by changing the output white level WRe to WRp. Thus, the level adjusting for dividing the level expanded to 100/(c %) into a predetermined number of bits (for example, 8 bits) is performed. As a result, the output histogram after the adjusting becomes as illustrated in FIG. 10(*c*). Further, the environment at this time is dark, and thus the projection histogram FIG. 10(*d*) is almost the same as the output histogram.

Third Example Embodiment

Figure 11:
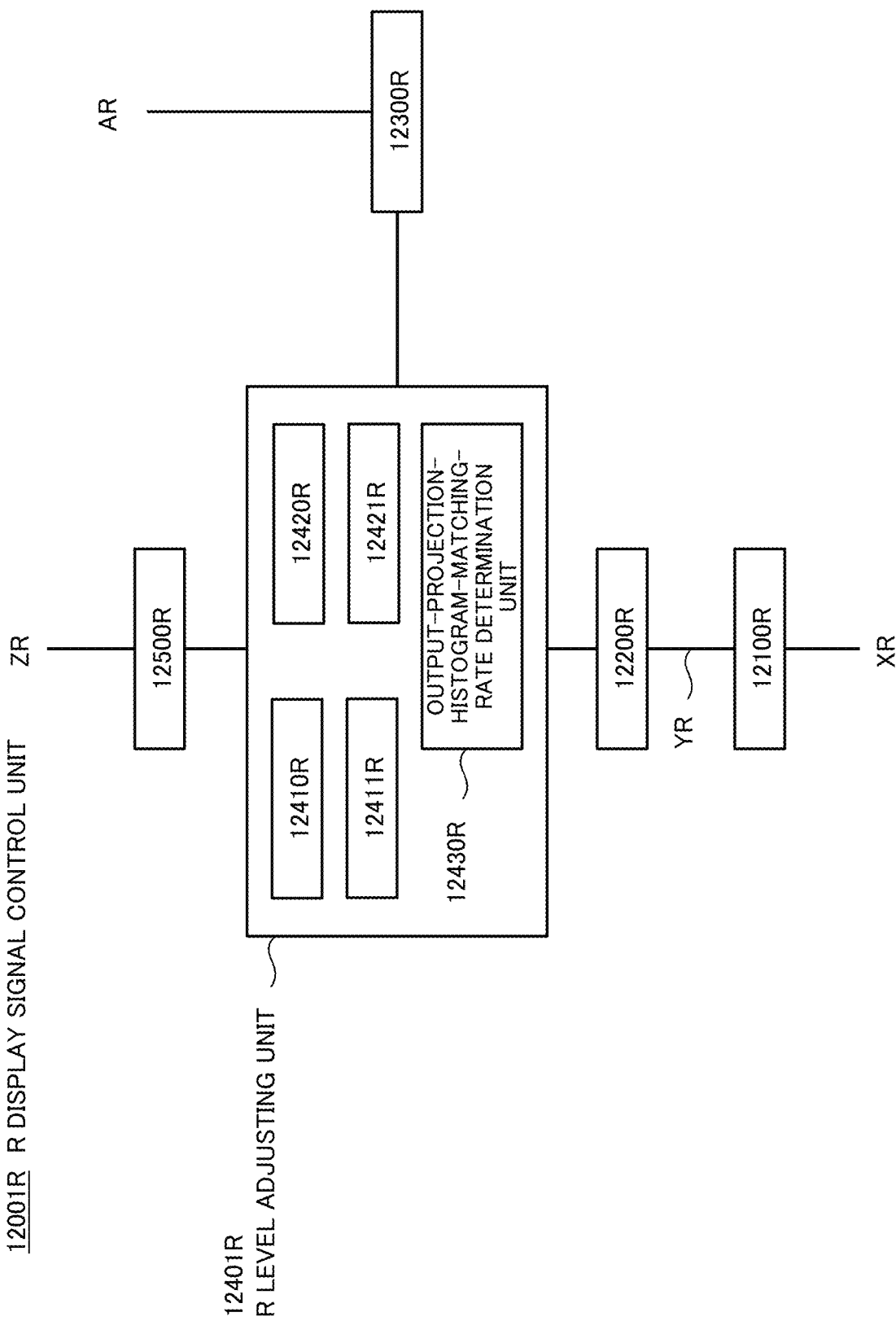
FIG. 11 is a block diagram illustrating a display signal control unit according to a third example embodiment.

FIG. 11 is a block diagram illustrating an R display signal control unit 12001R according to a third example embodiment. The R display signal control unit 12001R includes an output-projection-histogram-matching-rate determination unit 12430R in addition to the R display signal control unit 12000R according to the second example embodiment. Other components are similar to the components according to the second example embodiment, and thus the description will be omitted.

The output-projection-histogram-matching-rate determination unit 12430R determines how much a projection histogram of R and an output histogram of R match. Then, an R level adjusting unit 12401R performs, when a matching rate is low, white level adjusting and black level adjusting similar to the second example embodiment, and skips the adjusting when the matching rate is high.

Figure 12:
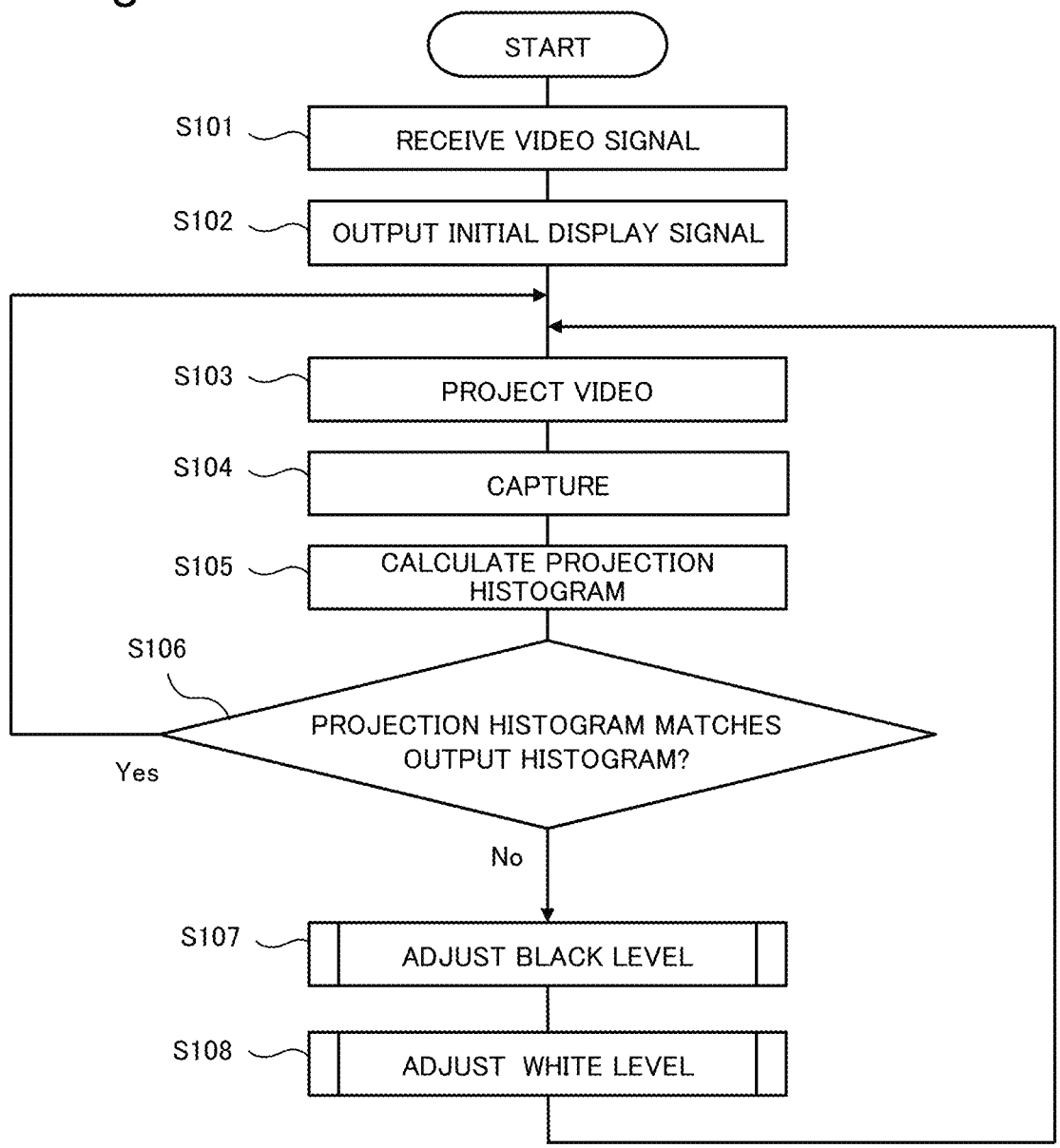
FIG. 12 is a flowchart illustrating an operation of a video projector according to the third example embodiment.

FIG. 12 is a flowchart illustrating an operation of a video projector including the R level adjusting unit 12401R. First, a video signal is received (S101). Next, an initial display signal is generated and output (S102). Then, a video is performed projection display in response to the initial display signal (S103). Next, the video is captured (S104), and a projection histogram is calculated (S105). Next, the projection histogram and an output histogram are compared and a matching rate is calculated. The matching rate can be calculated, for example, when the two histograms are overlapped, by an area of an overlapped portion occupying the entire area of the histogram. Then, when the matching rate is equal to or more than a predetermined threshold (for example, 90%) (Yes in S106), the operation returns to "a video is projected" in S103 without performing the adjusting. On the other hand, when the matching rate is less than the threshold, the black level adjusting (S107) and the white level adjusting (S108) are performed similarly to the second example embodiment, and the operation returns to S103. By performing the above operation, visibility can be efficiently improved without performing unnecessary level adjusting.

Next, a specific example according to the present example embodiment will be described.

Specific Example 3

Figure 13:
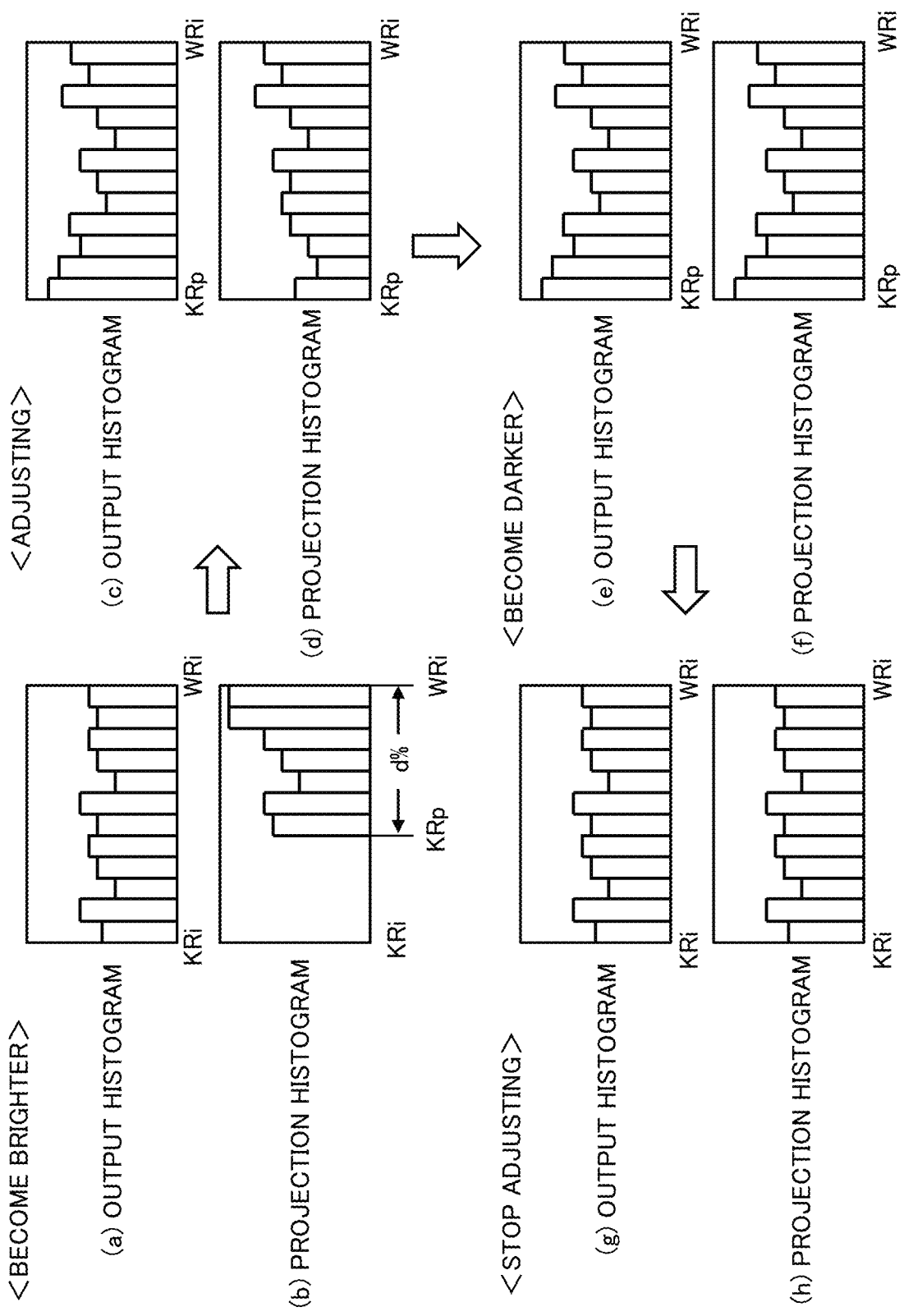
FIG. 13 is a schematic diagram illustrating a specific example 3 according to the third example embodiment.

One example of the operation of the video projector in the case where an environment for projecting a video changes over time as it becomes brighter or darker will be described. FIG. 13 is a schematic diagram illustrating behavior of a histogram at this time.

First, when an environment without disturbance such as incidence of external light is changed to a bright environment, a projection histogram becomes as illustrated in FIG. 13(*b*) in contrast to an output histogram in FIG. 13(*a*). Herein, only d % of the gradation of the level of the output histogram is displayed, and a projection black level KRp is detected. Then, the video projector performs level adjusting for adjusting the black level KRi of the output histogram to KRp (FIG. 13(*c*)). The adjusting increases the gradation of the projection histogram and improves visibility. Next, when the environment changes to become dark, the output histogram of FIG. 13(*e*) and the projection histogram of FIG. 13(*f*) become almost the same. When the output-projection-histogram-matching-rate determination unit detects the match, the video projector stops the level adjusting and outputs the initial display signal without adjusting as a display signal. As a result, the output histogram and the projection histogram are almost the same as the input histogram.

As described above, according to the present example embodiment, visibility can be ensured even when brightness of an environment changes.

Fourth Example Embodiment

Figure 14:
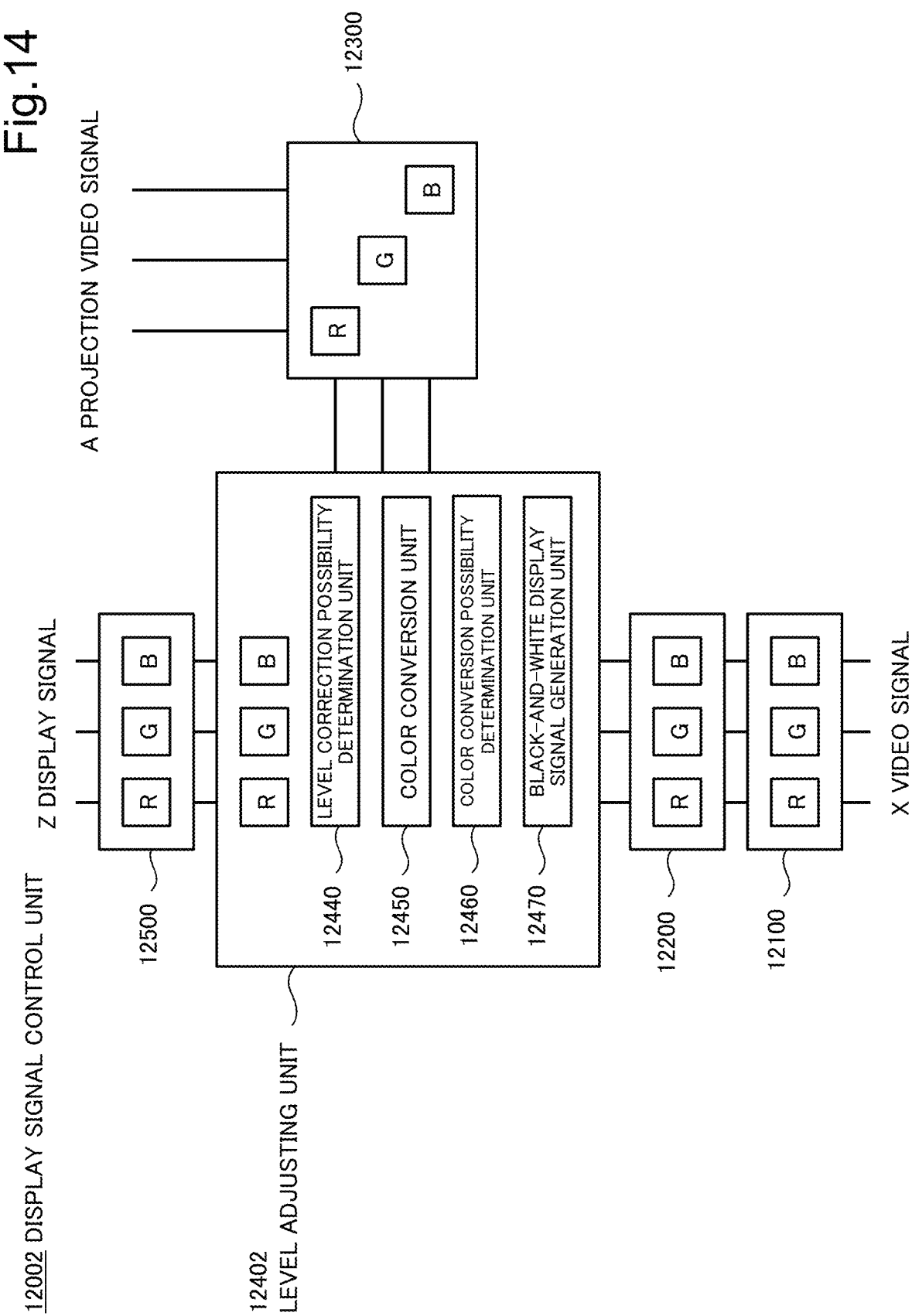
FIG. 14 is a block diagram illustrating a display signal control unit according to a fourth example embodiment.

FIG. 14 is a block diagram illustrating a display signal control unit 12002 according to a fourth example embodiment. The display signal control unit 12002 includes a level adjusting possibility determination unit 12440, a color conversion unit 12450, a color conversion possibility determination unit 12460, and a black-and-white signal generation unit 12470 in addition to the display signal control unit 12000 according to the second example embodiment.

The level adjusting possibility determination unit 12440 determines whether it is possible to improve visibility by level adjusting. For example, in an environment where strong light of a certain color is incident, even when a video is displayed in that color, the video cannot be recognized. In such a case, the level adjusting possibility determination unit 12440 determines that the level adjusting of that color is not possible, and selects display of the video in another color.

The color conversion unit 12450 converts a display signal of the color for which the level adjusting is not possible into a display signal of another color. For this purpose, the color conversion unit 12450 includes a color conversion lookup table (LUT) for color conversion.

The color conversion possibility determination unit 12460 determines, when the color conversion is performed, whether the display in the original color and the display in the same color generated by the conversion can be distinguished, and determines as the color conversion is possible when the colors can be distinguished, and determines as the color conversion is not possible when the colors cannot be distinguished. Whether conversion of a certain color into another color is possible can be determined, for example, by overlapping input histograms of both colors and using a ratio of the area occupied by the overlapped portions. For example, it can be determined that, when the ratio of the overlapped area is less than 70%, the color conversion is possible, and when the ratio is equal to or more than 70%, the color conversion is not possible.

When the color conversion possibility determination unit 12460 determines that a color to be converted is not possible to be converted into any other colors, the black-and-white display signal generation unit 12470 combines display signals of all colors and generates a black-and-white display signal.

Figure 15:
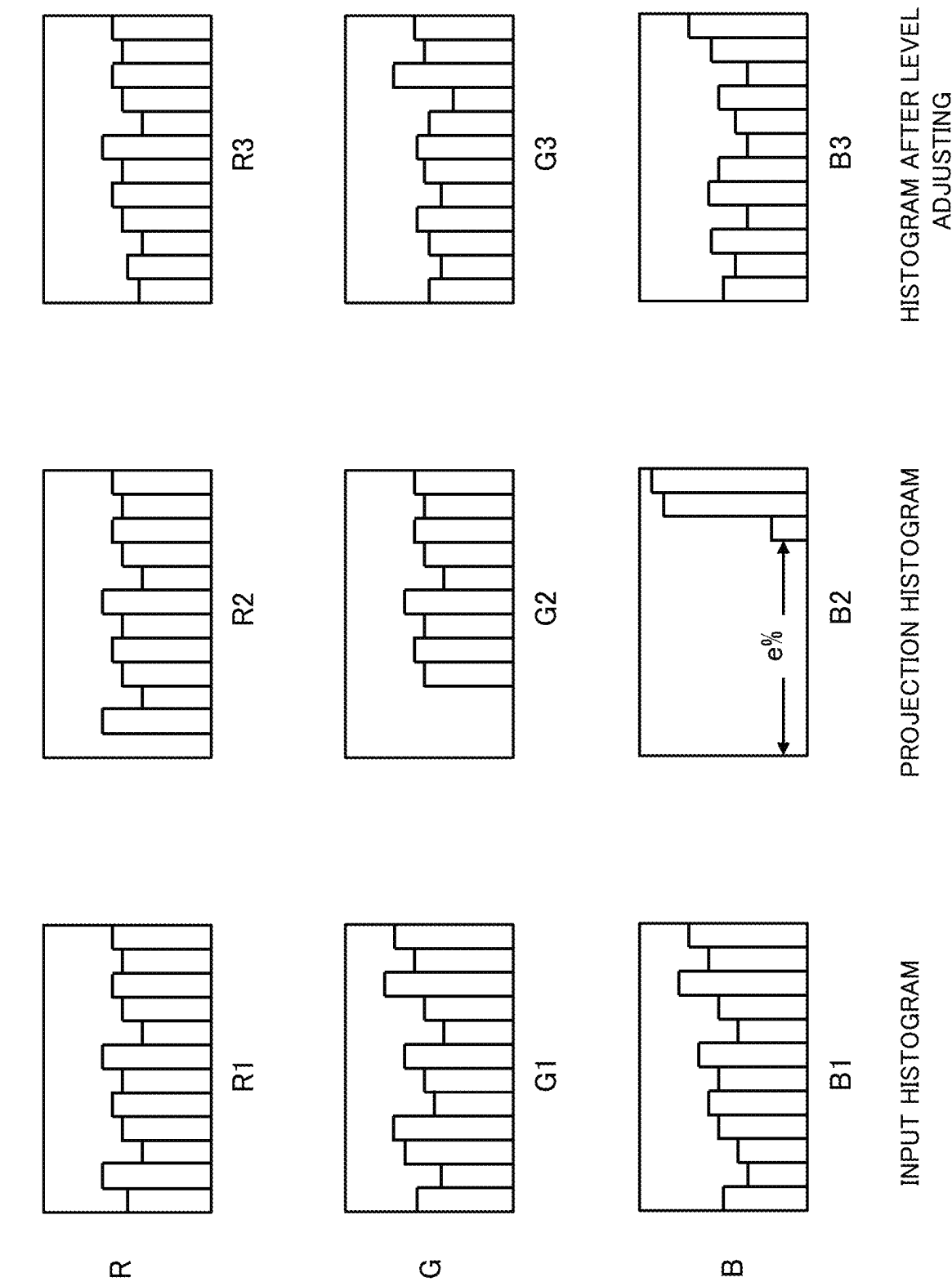
FIG. 15 is a schematic diagram illustrating a part of one example of a adjusting method according to the fourth example embodiment.

FIG. 15 is a schematic diagram illustrating a situation in which strong light of blue (B) is incident and display in blue becomes impossible, and thus B is converted into R. First, a video projector displays a video according to input histograms R1, G1, and B1 for each color of R, G, and B in the left side of the FIG. 15. Next, when a projection histogram of the video that captures the display is calculated, the projection histogram for each color of R, G, and B becomes R2, G2, and B2 as illustrated in the center of FIG. 15. Herein, due to the incidence of the blue light, in the projection histogram of B, a frequency of the histogram only exists in a part of the high luminance area. The ratio e % of the undisplayable range in the luminance range exceeds a predetermined threshold, and thus the level adjusting possibility determination unit 12440 determines that the level adjusting of B is not possible.

The color conversion unit 12450 refers to the projection histogram of another color and selects a color having a good projection condition as a conversion destination candidate. In the example of FIG. 15, the display gradation range of R is the widest, and thus the conversion from B to R is performed. When the conversion is performed, the same level setting as for R is performed for the display signal of B, and the histogram after the level adjusting becomes R3, G3, and B3 as illustrated in the right side of FIG. 15.

Figure 16:
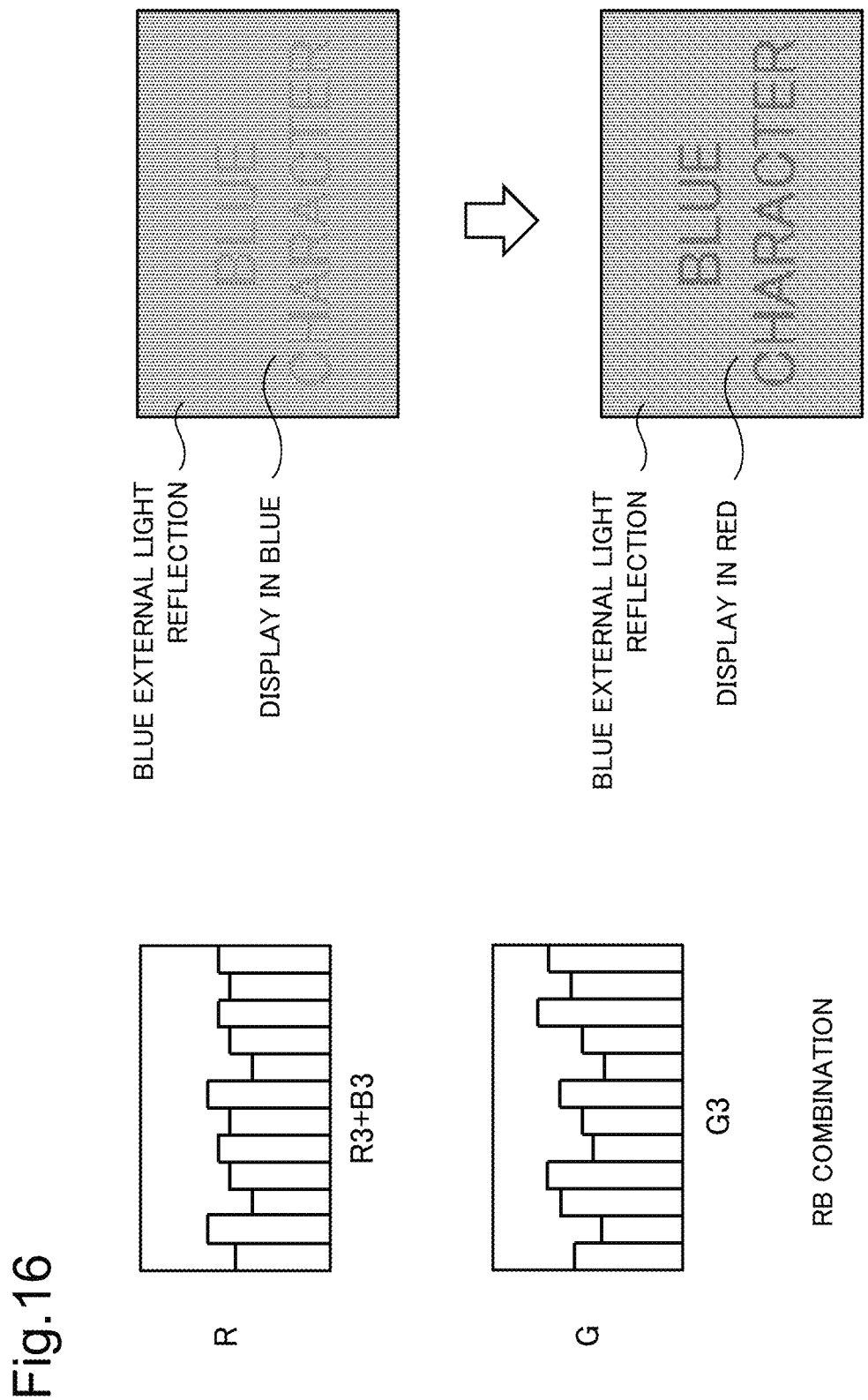
FIG. 16 is a schematic diagram illustrating another part of one example of the adjusting method according to the fourth example embodiment.

Next, the display signal of B3 generated in the above description is converted into R, and a display signal associated with a histogram of R3+B3 is combined as illustrated in the left side of the FIG. 16 and displays as a new display signal of R. The right side of FIG. 16 schematically illustrates a situation in which visibility is improved by converting the display of the video displayed in blue (B) on a projection surface with blue external light reflection into a display in red (R).

Figure 17:
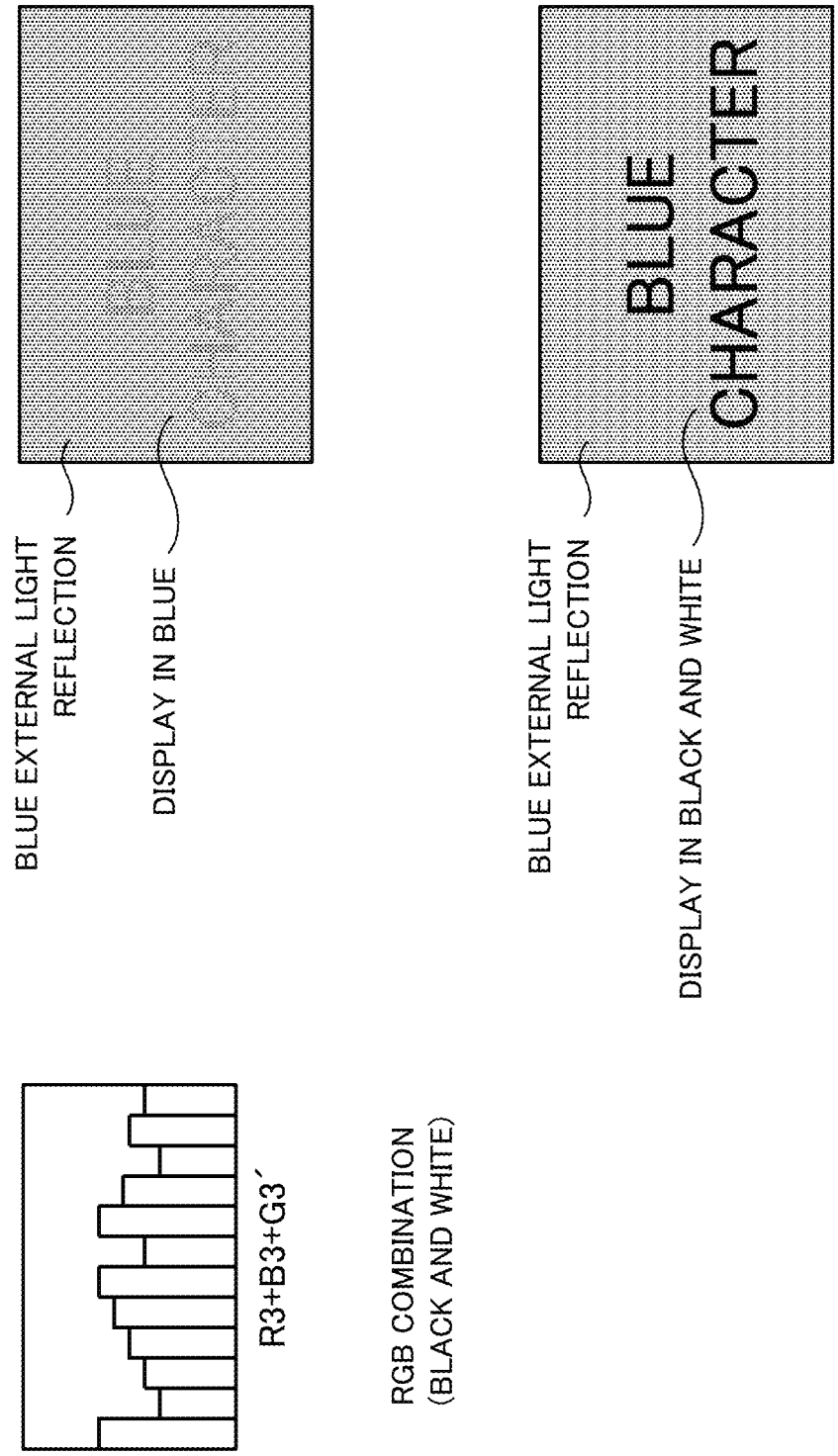
FIG. 17 is a schematic diagram illustrating another example of the adjusting method according to the fourth example embodiment.

The above description is an operation in the case where distinguishment of the display is possible by the color conversion, however it may happen that the display is not possible to be converted into any color. In this case, the color conversion possibility determination unit 12460 determines that the color conversion is not possible. Then, the black-and-white display signal generation unit 12470 generates a black-and-white display signal. The black-and-white display signal can be generated by combining the display signal of each color. Then, each color is projected at a ratio that the combined color becomes white, and a projection display operation is performed with the same black-and-white display signal, thereby performing black-and-white display. The left side of FIG. 17 illustrates a histogram of the display signal generated by RGB combination, and the right side schematically illustrates a visibility improvement situation when display in blue is switched to display in black and white in an environment with blue external light reflection.

As described above, according to the present example embodiment, visibility can be improved even in a situation where the visibility cannot be improved sufficiently by level adjusting.

Fifth Example Embodiment

Figure 18:
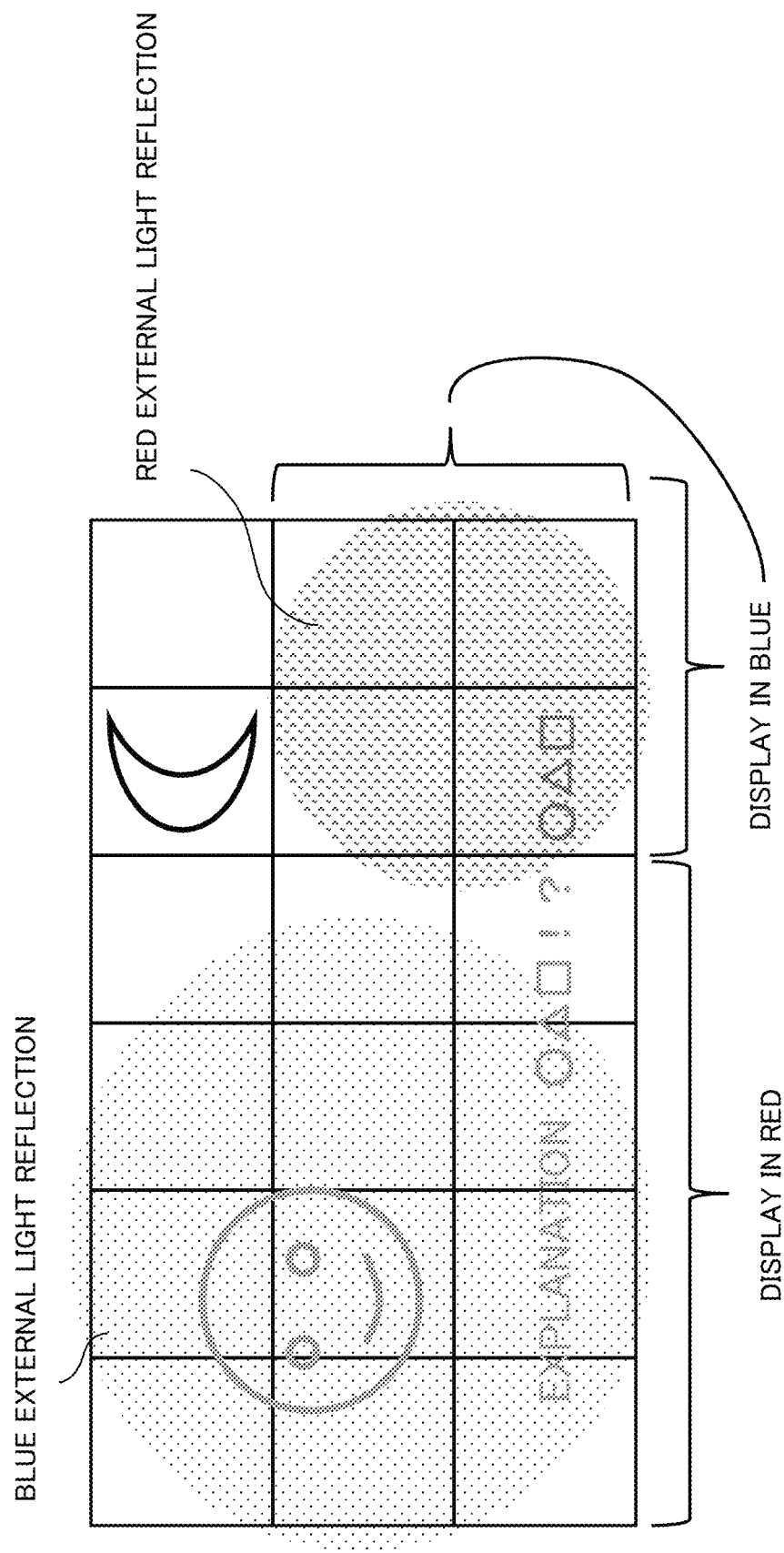
FIG. 18 is a schematic diagram illustrating a adjusting method according to a fifth example embodiment.

The level adjusting and the color conversion according to the first to fourth example embodiments may be performed over the entire projection range of a projection video, or may be performed by dividing a screen. FIG. 18 is a schematic diagram illustrating an example in which color conversion is controlled for each block acquired by dividing a screen into horizontally 6 portions and vertically 3 portions. It is assumed that there is blue external light reflection in a range of blocks by 4 columns×3 rows from the left, and red external light reflection in blocks by 2 columns×2 rows from the lower right. Then, in the 12 blocks with the blue external light reflection, display in blue is converted into red and displayed, and in the 4 blocks with the red external light reflection, display in red is converted into blue and displayed. In the other 2 blocks, the color conversion is not performed.

By the conversion, the first half of a description is red and the second half is blue, however characters can be distinguished and read. As described above, according to the present example embodiment, it is possible to recognize information in a video without missing any information.

A program that causes a computer to execute processing according to the above-described first to fifth example embodiments and a recording medium storing the program are also included in the scope of the present invention. As the recording medium, for example, a magnetic disk, a magnetic tape, an optical disk, a magneto-optical disk, a semiconductor memory, and the like can be used.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-026171, filed on Feb. 16, 2018, the disclosure of which is incorporated herein in its entirety by reference.

REFERENCE SIGNS LIST

1 Initial level setting means
2 Level adjusting means
3 Projection display means
4 Image capture means
5 Projection histogram calculation means
10, 10000 Video projector
20 Screen
11000 Video signal input unit
12000 Display signal control unit
12100 Initial level setting unit
12400 Level adjusting unit
12300 Projection histogram calculation unit
12200 Input histogram calculation unit
12500 Output histogram calculation unit
13000 Display control unit
14000 Projection display element
15000 Camera

What is claimed is:

1. A video projector comprising:
a processor;
a memory storing executable instructions that, when executed by the processor, causes the processor to perform as:
an initial level setter receiving a video signal of a plurality of colors, and outputting an initial display signal acquired by performing, for each of the colors, a predetermined luminance level setting on the video signal;
a level adjuster performing, for each of the colors, level adjusting on the initial display signal and outputting the signal as a display signal;
a projection display performing projection display, based on the display signal; and
an image capturer capturing a projection video projected by the projection display;
wherein the processor further performs as:
a projection histogram calculator calculating, for each of the colors, a projection histogram representing luminance distribution of the projection video captured by the image capture, and
wherein the level adjuster performs the level adjusting, based on the projection histogram, and
the level adjuster performs level adjusting for shifting a black level to a high luminance side when there is a first non-display area with a frequency less than a first threshold on a black level side of the projection histogram.

2. The video projector according to claim 1, wherein the level adjuster performs level adjusting for shifting a white level to a low luminance side when there is a second non-display area with a frequency less than a second threshold on a white level side of the projection histogram.

3. The video projector according to claim 1, wherein the level adjuster includes
an output-projection-histogram-matching determiner determining a matching degree between an output histogram associated with the display signal and the projection histogram, and,
when the matching degree is equal to or more than a predetermined value, stops the level adjusting.

4. The video projector according to claim 3, wherein the level adjuster includes
a level adjusting possibility determiner determining, when a ratio of the first non-display area to a luminance range of the output histogram of a first color is equal to or more than a second threshold, that level adjusting of the first color is not possible, and
a color conversion converter converting, when the level adjusting is not possible, a display signal of the first color into a display signal of a second color, and combines the display signal of the first color with the display signal of the second color.

5. The video projector according to claim 4, wherein the level adjuster includes
a color conversion possibility determiner determining whether conversion from the first color into the second color is possible, based on a matching degree between a histogram of a display signal when the first color is converted into the second color and a histogram of an original display signal of the second color.

6. The video projector according to claim 5, wherein the level adjuster includes
a black-and-white display signal generation means for generator generating, when it is determined that conversion from the first color into the second color is not possible, a black-and-white display signal acquired by combining initial display signals of a plurality of the colors, and
the projection display performs projection display of a black-and-white video in response to the black-and-white display signal.

7. A video display method comprising:
receiving a video signal of a plurality of colors;
outputting an initial display signal acquired by performing, for each of the colors, a predetermined luminance level setting on the video signal;
performing, for each of the colors, level adjusting on the initial display signal and outputting the signal as a display signal;
displaying a projection video, based on the display signal;
capturing the projection video;
calculating, for each of the colors, a projection histogram representing luminance distribution of the projection video;
performing the level adjusting, based on the projection histogram; and
performing level adjusting for shifting a black level to a high luminance side when there is a non-display area with a frequency less than a first threshold on a black level side of the projection histogram.

8. A recording medium recording a video display program that causes a computer to execute:
receiving a video signal of a plurality of colors;

outputting an initial display signal acquired by performing, for each of the colors, a predetermined luminance level setting on the video signal;

performing, for each of the colors, level adjusting on the initial display signal and outputting the signal as a display signal;

displaying a projection video to a video projector, based on the display signal;

receiving a video signal in which the projection video is captured;

calculating, for each of the colors, a projection histogram representing luminance distribution of the projection video;

performing the level adjusting, based on the projection histogram; and performing level adjusting for shifting a black level to a high luminance side when there is a non-display area with a frequency less than a first threshold on a black level side of the projection histogram.

9. The video projector according to claim 2, wherein the level adjuster includes an output-projection-histogram-matching determiner determining a matching degree between an output histogram associated with the display signal and the projection histogram, and, when the matching degree is equal to or more than a predetermined value, stops the level adjusting.

10. The video projector according to claim 9, wherein the level adjuster includes a level adjusting possibility determiner determining, when a ratio of the first non-display area to a luminance range of the output histogram of a first color is equal to or more than a second threshold, that level adjusting of the first color is not possible, and a color converter converting, when the level adjusting is not possible, a display signal of the first color into a display signal of a second color, and combines the display signal of the first color with the display signal of the second color.

11. The video projector according to claim 10, wherein the level adjuster includes a color conversion possibility determiner determining whether conversion from the first color into the second color is possible, based on a matching degree between a histogram of a display signal when the first color is converted into the second color and a histogram of an original display signal of the second color.

12. The video projector according to claim 11, wherein the level adjuster includes a black-and-white display signal generator generating, when it is determined that conversion from the first color into the second color is not possible, a black-and-white display signal acquired by combining initial display signals of a plurality of the colors, and the projection display performs projection display of a black-and-white video in response to the black-and-white display signal.

* * * * *